H. TAYLOR.
TIRE PUMP.
APPLICATION FILED DEC. 16, 1915.
1,338,711.
Patented May 4, 1920.
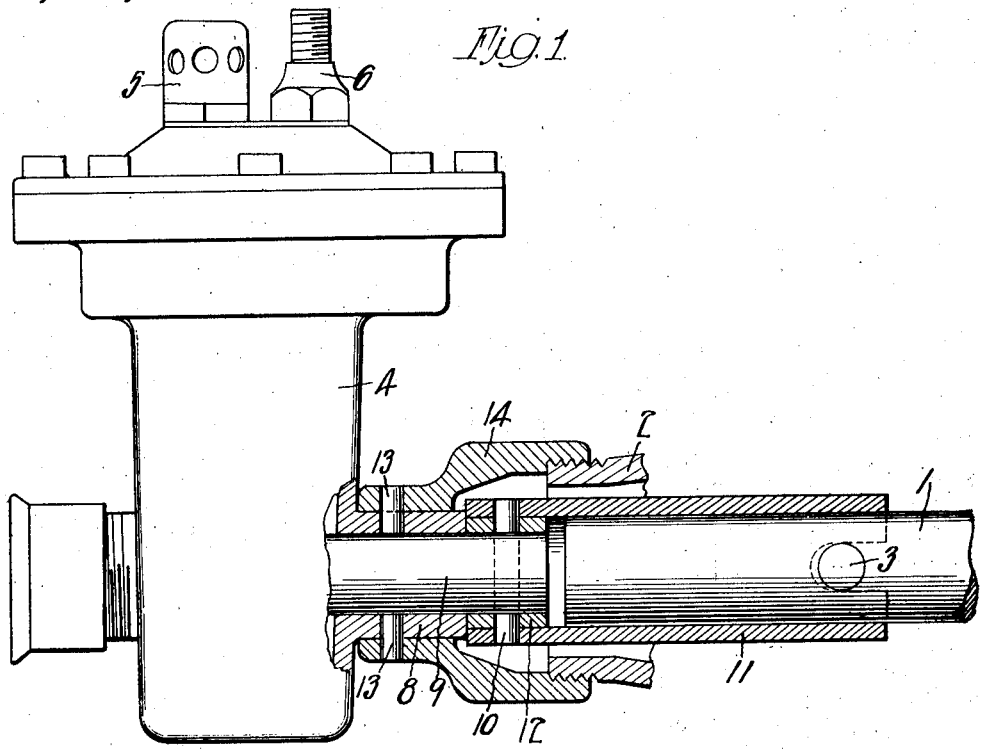
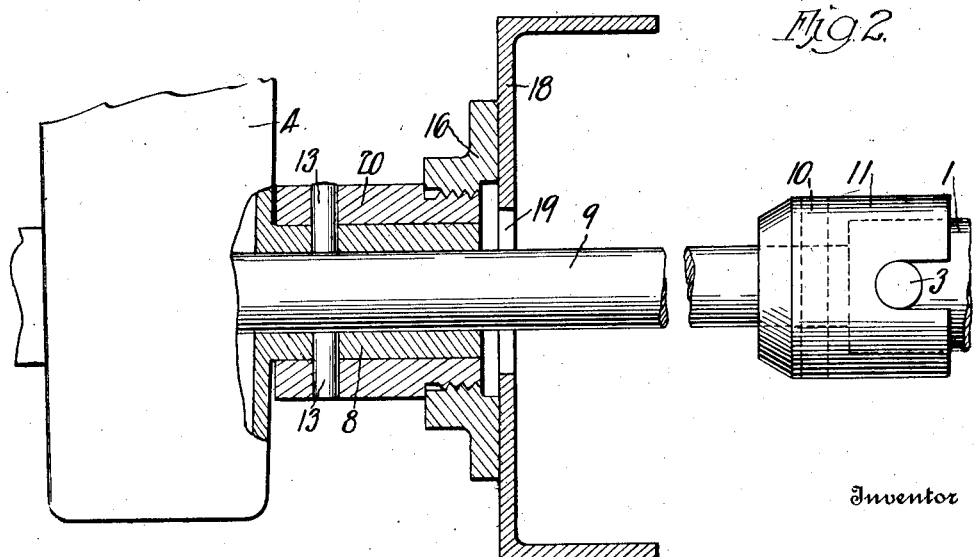
Witness
E. K. Barrett
Inventor
Huston Taylor,
By Pagelsen & Spencer
Attorneys

UNITED STATES PATENT OFFICE.

HUSTON TAYLOR, OF DETROIT, MICHIGAN, ASSIGNOR TO DETROIT CARRIER AND MANUFACTURING COMPANY, OF DETROIT, MICHIGAN, A CORPORATION OF DELAWARE.

TIRE-PUMP.

1,338,711.  Specification of Letters Patent.  Patented May 4, 1920.

Application filed December 16, 1915. Serial No. 67,145.

*To all whom it may concern:*

Be it known that I, HUSTON TAYLOR, a citizen of the United States, and residing at Detroit, in the county of Wayne and State of Michigan, have invented a new and Improved Tire-Pump, of which the following is a specification.

Various constructions have been proposed for attaching tire pumps to a driven shaft of a motor vehicle, but because of initial expense, number of parts or for other reasons, they have failed to go into use to any great extent. The object of the present invention is to provide very cheaply a simple and compact device of this nature which properly meets the stresses incurred, and which may be readily secured to or detached from the support in such manner that its pump shaft is simultaneously coupled to or uncoupled from the engine shaft, as the case may be.

The invention consists in the details of construction shown, described and claimed.

In the drawings, Figure 1 is a fragmentary part-elevation part vertical section of one embodiment of my invention. Fig. 2 is a similar view of a modification.

Referring to Fig. 1, 1 indicates the engine shaft of a motor vehicle and 2 the forward end of the crank casing threaded, as usual, to receive a cap (not shown) whereby dust is excluded and oil is prevented from escaping. The shaft is provided near its forward end with a cross-pin or clutch member 3 to which a cranking lever may be applied in a well known way.

The pump body 4, provided with the intake 5 and discharge fitting 6 to which a hose (not shown) may be attached, is preferably of the well known diaphragm type, and projecting therefrom is the tubular bearing 8 in which the pump shaft 9 is rotatable. The latter projects from the bearing and has passing therethrough a cross-pin 10, the ends of which are received in the tubular clutch member 11 that conforms to the shaft 1 and has its end slotted to receive the cross pin or clutch member 3. As the pump shaft is ordinarily of lesser diameter than the engine shaft, a tubular bushing 12 is interposed between the former and the clutch member 11. The bearing 8 has projecting therefrom cross pins 13 that are received in holes in the tubular supporting member 14, the outer (or rear) end of which is enlarged to inclose and stand away from the clutch member 11 and is internally threaded to correspond to the threads on the crank case.

The modification shown in Fig. 2 differs from that heretofore described (except in the proportion of the parts) merely in that the forward end of the crank casing is superseded in its supporting function by an internally threaded normally capped (cap not shown) member 16, bolted or otherwise secured to the front cross bar 18, which may be of channel cross-section and is pierced at 19 to allow the passage of the pump shaft 9; and in that an externally threaded tubular supporting member 29 is used in lieu of the member 14.

In either case the construction is strong, the pump is rigidly supported (both as regards longitudinal and rotative movements in respects to the axis of the engine shaft), may be readily attached to or detached from the support and coupled to or uncoupled from the engine shaft, and may be made at low cost without special operations.

It is clear that changes may be made in the details of construction without departing from the spirit of my invention; I do not, therefore, wish to be limited otherwise than as indicated by the subjoined claims.

I claim:—

1. In combination with the engine shaft of a motor vehicle and a fixed member having an opening therethrough substantially concentric with the axis of the engine shaft, an air pump including a pump body and a pump shaft of less diameter than the engine shaft and in substantial alinement therewith, a clutch member on the engine shaft, a tubular clutch member inclosing the end of the engine shaft and engaging the clutch member thereon, a tubular bushing interposed between the tubular clutch member and the pump shaft, means for preventing relative rotation of the pump shaft, the bushing and the tubular clutch member, and means for detachably connecting the pump body to the fixed member and preventing rotation of the former in respect to the latter.

2. In combination with the engine shaft of a motor vehicle and a fixed member having an opening therethrough substantially concentric with the axis of the engine shaft, said member also being threaded substantially concentric to said axis, an air pump including a pump body and a pump shaft of less diameter than the engine shaft and in substantial alinement therewith, a clutch member on the engine shaft, a tubular clutch member inclosing the end of the engine shaft and engaging the clutch member thereon, a tubular bushing interposed between the tubular clutch member and the pump shaft, means for preventing relative rotation of the pump shaft, the bushing and the tubular clutch member, and threaded means for engaging the first mentioned threads to detachably connect the pump body to the fixed member and prevent rotation of the former in respect to the latter.

In testimony whereof I sign this specification.

HUSTON TAYLOR.